US012379282B2

(12) United States Patent
McNeil et al.

(10) Patent No.: US 12,379,282 B2
(45) Date of Patent: *Aug. 5, 2025

(54) METHOD FOR TESTING DRIVE SHAFTS AND OTHER BODIES

(71) Applicant: Goodrich Corporation, Charlotte, NC (US)

(72) Inventors: Douglas McNeil, Rome, NY (US); Jeffrey J. Allen, Oneida, NY (US); Joyel Schaefer, Earlville, NY (US); Mark R. Gurvich, Middletown, CT (US); Michael J. King, Sauquoit, NY (US); Brayton Reed, New York Mills, NY (US)

(73) Assignee: Goodrich Corporation, Charlotte, NC (US)

( * ) Notice: Subject to any disclaimer, the term of this patent is extended or adjusted under 35 U.S.C. 154(b) by 291 days.

This patent is subject to a terminal disclaimer.

(21) Appl. No.: 17/958,892

(22) Filed: Oct. 3, 2022

(65) Prior Publication Data
US 2024/0110847 A1 Apr. 4, 2024

(51) Int. Cl.
G01N 29/04 (2006.01)
G01M 13/028 (2019.01)
G01N 29/22 (2006.01)

(52) U.S. Cl.
CPC ........ *G01M 13/028* (2013.01); *G01N 29/043* (2013.01); *G01N 29/225* (2013.01);
(Continued)

(58) Field of Classification Search
CPC ............... G01M 13/028; G01N 29/00; G01N 29/04–26; G01N 29/225; G01N 29/256; G01N 2291/0289; G01N 2291/262
See application file for complete search history.

(56) References Cited

U.S. PATENT DOCUMENTS

| 7,395,714 B2 | 7/2008 | Georgeson et al. |
| 7,617,730 B2 | 11/2009 | Georgeson |

(Continued)

FOREIGN PATENT DOCUMENTS

| FR | 3093185 A1 | 8/2020 |
| IN | 221921 | 6/2007 |

OTHER PUBLICATIONS

European Search Report for EP Application No. 23199370.0 dated Jan. 15, 2024.

(Continued)

*Primary Examiner* — Nguyen Q. Ha
(74) *Attorney, Agent, or Firm* — Carlson, Gaskey & Olds, P.C.

(57) ABSTRACT

A method of testing a part includes placing a first member on a part to be tested. A second member is placed on an opposed surface of the part. One of the members has an ultrasonic transmitter and the other has an ultrasonic receiver. At least one of the members has at least one magnetic element and the other has at least one of a magnetic element or a ferromagnetic metallic element which is attracted to magnets. One of the members moves along the surface of the part such that magnetic attraction causes the other to move along the opposed surface of the part with the one of the members. A controller causes an ultrasonic signal to be sent from the transmitter through the part to be tested which is received by the receiver and then analyzed by an ultrasonic testing machine.

18 Claims, 9 Drawing Sheets

(52) U.S. Cl.
CPC ............... *G01N 2291/0289* (2013.01); *G01N 2291/262* (2013.01)

(56) References Cited

U.S. PATENT DOCUMENTS

| | | |
|---|---|---|
| 7,706,985 B2 | 4/2010 | Fogarty et al. |
| 9,266,625 B1* | 2/2016 | Troy ..................... G01N 29/28 |
| 9,335,298 B2 | 5/2016 | O'Keefe et al. |
| 2006/0055396 A1* | 3/2006 | Georgeson ........... G01N 29/265 |
| | | 324/202 |
| 2006/0162456 A1 | 7/2006 | Kennedy et al. |
| 2006/0201252 A1* | 9/2006 | Georgeson ......... G01N 29/2481 |
| | | 73/641 |
| 2010/0024559 A1* | 2/2010 | Bossi .................... G01N 29/28 |
| | | 73/644 |
| 2016/0305913 A1* | 10/2016 | Baillard ................. G01N 29/04 |
| 2021/0041401 A1 | 2/2021 | Kahlert et al. |
| 2024/0110895 A1* | 4/2024 | McNeil ............... G01N 29/265 |

OTHER PUBLICATIONS

European Search Report for EP Application No. 23200246.9 dated Jan. 15, 2024.

\* cited by examiner

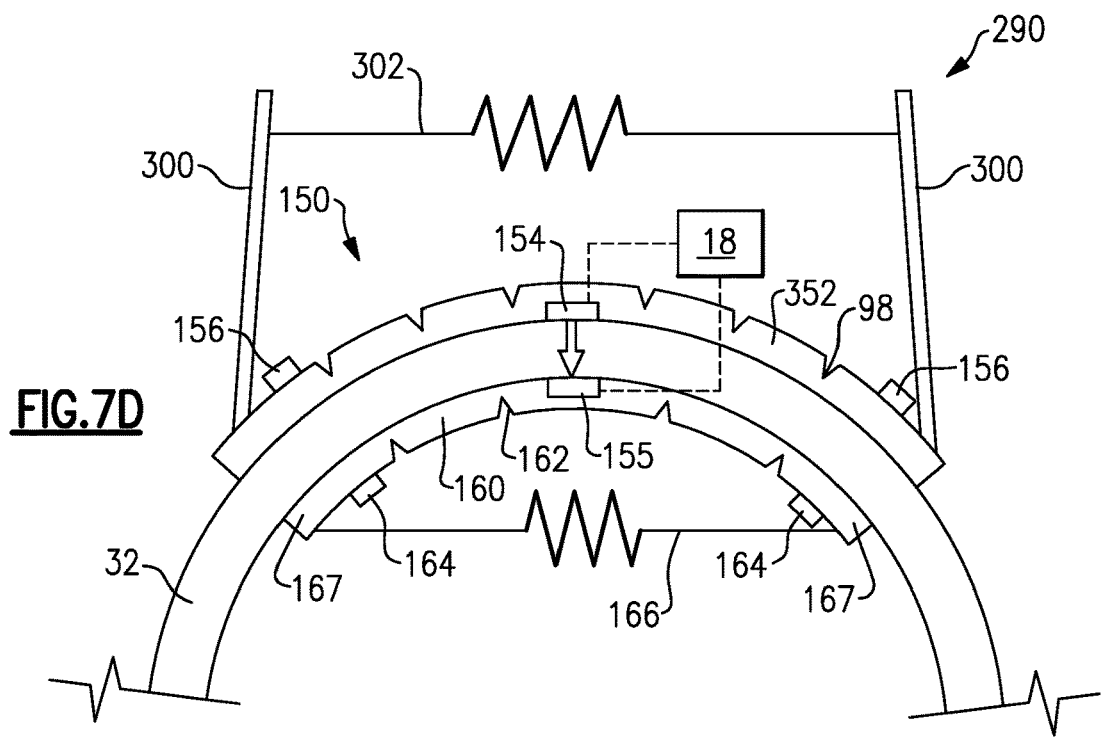
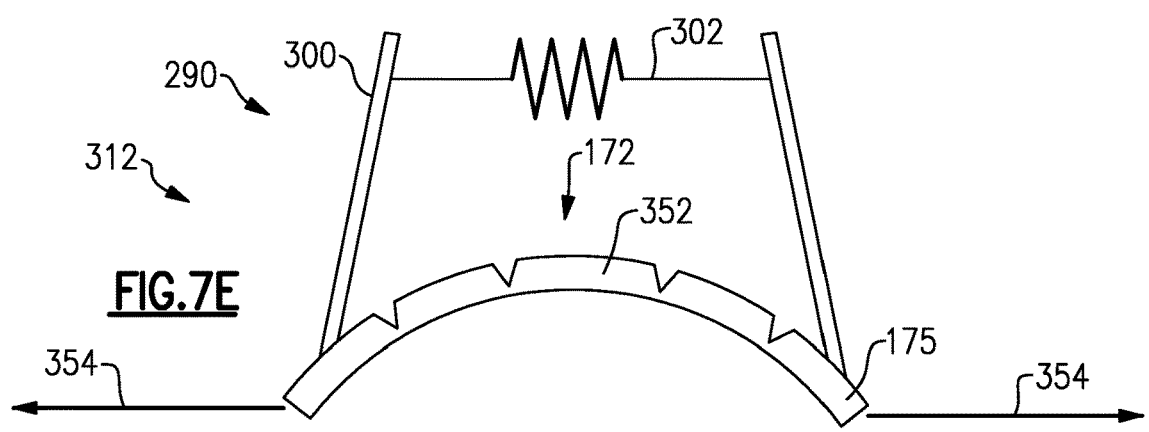
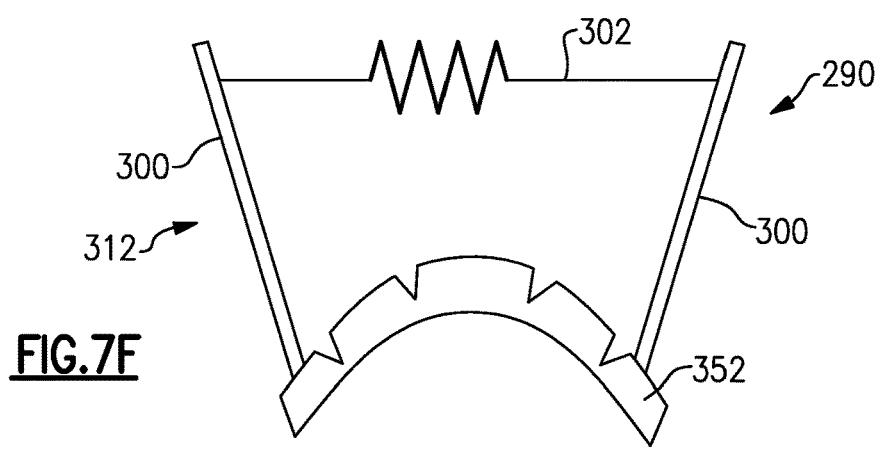

METHOD FOR TESTING DRIVE SHAFTS AND OTHER BODIES

BACKGROUND

This application relates to a method for ultrasonic testing of various bodies.

Drive shafts are known for any number of applications. Historically, drive shafts for heavy mechanical machines have been formed of metal. More recently it has been proposed to utilize fiber-reinforced polymer-matrix composite materials. In such shafts there are a plurality of layers of the composite materials. Both composite and metallic drive shafts need a method for quality control upon fabrication to detect defects, voids, damage, etc, Similarly, methods of structural health monitoring during service may be needed for periodic inspections to characterize potential service-generated damage and assess levels of their severity for follow-up decisions (e.g., repair, replacement, continuation of service without corrective actions). Therefore, some method of testing and characterization of internal damage or/and imperfections in drive shafts is needed.

It is known to utilize an ultrasonic transmitter on one side of a hollow drive shaft with an ultrasonic receiver on the other side of the wall of the hollow drive shaft. The transmitter and receiver are moved along a surface of the shaft, and signals are taken which will reveal any flaw or damages, such as, for example, debonded layers in composite shafts or internal cracks in metallic shafts.

The known device and method move and position both the receiver(s) and the transmitter(s) separately.

SUMMARY

A method of testing a part includes the steps of placing a first member on a surface of a part to be tested. A second member is placed on an opposed surface of the part to be tested. One of the first and second members have an ultrasonic transmitter and the other has an ultrasonic receiver. At least one of the first and second members have at least one magnetic element and the other of the first and second members have at least one of a magnetic element or a ferromagnetic metallic element which is attracted to magnets, and moves one of the first and second members along the surface of the part such that magnetic attraction causes the other of the first and second members to move along the opposed surface of the part with the one of the members. A controller causes an ultrasonic signal to be sent from the transmitter through the part to be tested which is received by the receiver and then analyzed by an ultrasonic testing machine.

These and other features will be best understood from the following drawings and specification, the following is a brief description.

BRIEF DESCRIPTION OF THE DRAWINGS

FIG. 7D shows another embodiment of a testing device that may be deformed.

FIG. 7E shows another feature of a portion of the FIG. 7D embodiment deformed to a different position during installation.

FIG. 7F shows yet another feature of the FIG. 7D testing device before installation.

DETAILED DESCRIPTION

Figure 1:
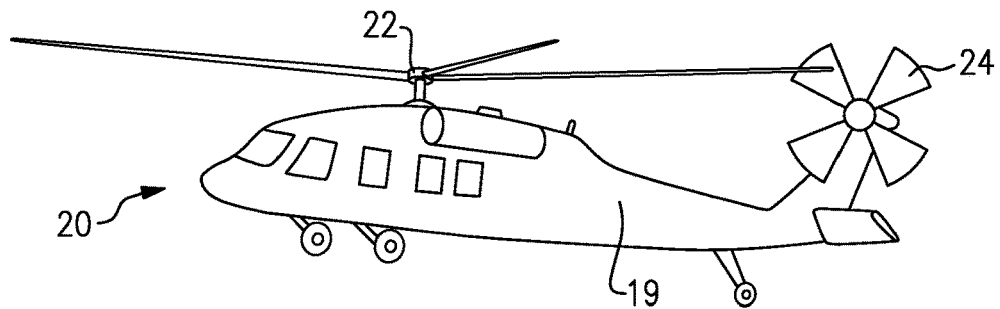
FIG. 1 schematically shows a helicopter.

A representative aircraft with a drive system, is illustrated in FIG. 1 as a helicopter 20 having a fuselage body 19, a main rotor pack 22 and a tail rotor 24.

Figure 2A:
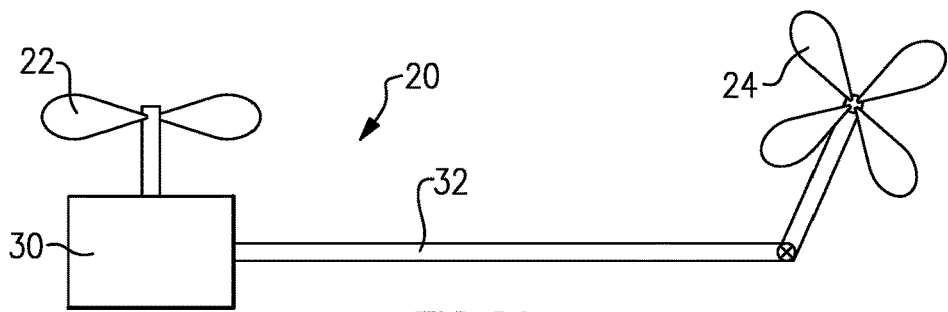
FIG. 2A shows a drive arrangement within the helicopter of FIG. 1.

As shown in FIG. 2A, a helicopter 20 has an engine 30 driving the main rotor pack 22 and a shaft 32 extending from engine 30 through the fuselage to the rear of the helicopter to drive the tail rotor 24. As can be appreciated, the shaft 32 is relatively long, has a circular cross-section and is hollow.

A diameter of the drive shaft and thickness of its walls is typically defined according to structural integrity criteria, e.g., criteria based on strength, fatigue, buckling and vibrational performance, among others. Due to its length the drive shaft can often be designed as a system consisting of several interconnected separate cylindrical shafts.

In a representative rotorcraft embodiments, the separate shafts may be on the order of 12 feet, as an example, with an outside diameter of approximately 5 inches. Of course, other shaft dimensions would benefit from this disclosure. Also, drive shafts applications for numerous platforms and configurations in rotorcraft and fixed-wing aircraft may benefit from this disclosure. In addition, the proposed disclosure can benefit similar testing of drive shafts and/or tubular components for non-aircraft applications, e.g., in automotive, shipbuilding, chemical, gas/oil industries. The disclosure to follow is particularly useful in testing the integrity of drive shafts having a very high aspect ratio, or a ratio of a length of the shaft to its diameter.

With respect to materials of the drive shafts, in some embodiments they can be made of composite materials or metals. Composite drive shafts can be made, for example, of carbon, glass or natural (e.g., Kevlar) fibers or any of their combinations. Composite fiber-reinforced drive shafts can be embedded, for example, in thermoset and thermoplastic polymeric matrices. In some embodiments fiber-reinforced polymer-matrix composite drive shafts can have laminated designs along their walls, where individual uni-directionally reinforced layers can be placed together but in individual orientations. Potential debonding between different individual layers can be a manufacturing concern, and their efficient detection is a key motivation of the present disclosure.

In the case of metallic drive shafts, they can be made, for example, from steel, aluminum, titanium or their numerous alloys. Detection of their internal damages due to manufacturing imperfections or/and service conditions is another key motivation of the present disclosure.

Figure 2B:
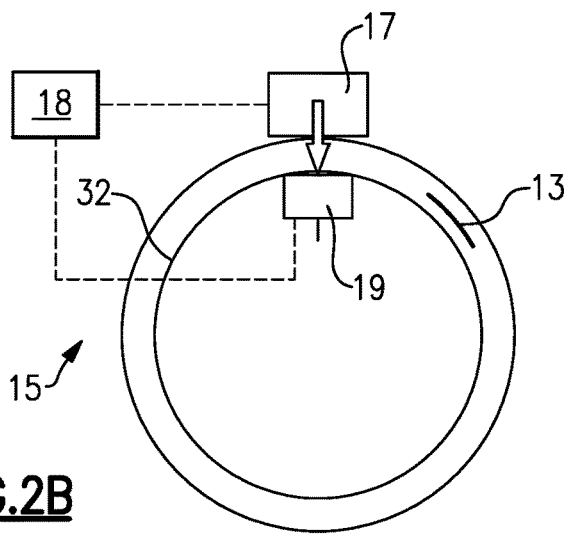
FIG. 2B is an axial cross-sectional view of a prior art testing system for a drive shaft.

FIG. 2B shows a prior art method of testing the integrity of a shaft 32 which is formed of composite layers. As shown, a test setup 15 includes an ultrasonic transmitter 17 on an outer surface of the hollow wall shaft 32 and an ultrasonic receiver 19 on an opposed side of the hollow wall of the shaft 32. A debonded area 13 is shown where adjacent lamina have become debonded from each other. Note, the ultrasonic transmitter 17 and receiver 19 in the prior art have a flat contact surface that does not correspond to the shape of the surfaces of shaft 32.

The transmitter 17 is controlled by electronic control 18 to send an ultrasonic signal through the shaft wall and is received by receiver 19. Receiver 19 communicates with controller 18 such that the existence or absence of damage, such as, for example, a debond area in the shaft wall can be tested. The transmitter and receiver are moved during this testing. By moving the transmitter and receiver along a surface of the shaft 32 in both circumferential and axial directions the debonded area 13 can be identified. In this method of the prior art, both the receiver 19 and transmitter 17 are not mechanically fixed together and have to be moved independently.

While the method shown in FIG. 2B does provide good information about damage, such as the debonded area 13, it is somewhat limited to drive shafts with relatively smaller aspect ratios of length to diameter where the transmitter and receiver can be moved and located independently.

For a drive shaft such as described above having a much larger aspect ratio of length to diameter, it would be most difficult to move the internal member during such testing.

Figure 2C:
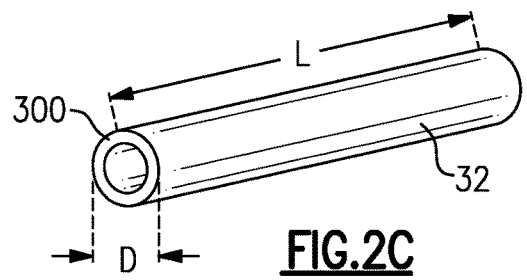
FIG. 2C shows a perspective detailed view of a drive shaft which may be tested by the present disclosure more efficiently.

FIG. 2C shows a drive shaft 32 which may especially benefit from this disclosure. As shown, there is a hollow wall 300 having an outer diameter D. The shaft 32 has an axial length L. In typical rotorcraft applications, shaft 32 may have an aspect ratio of L/D, for example, between 5 and 40. The prior art method of FIG. 2B would not be very practical to test such a relatively long drive shaft 32. As one example, it would be difficult to manipulate the receiver 19 within the long shaft 32 with its relatively small diameter.

Figure 3A:
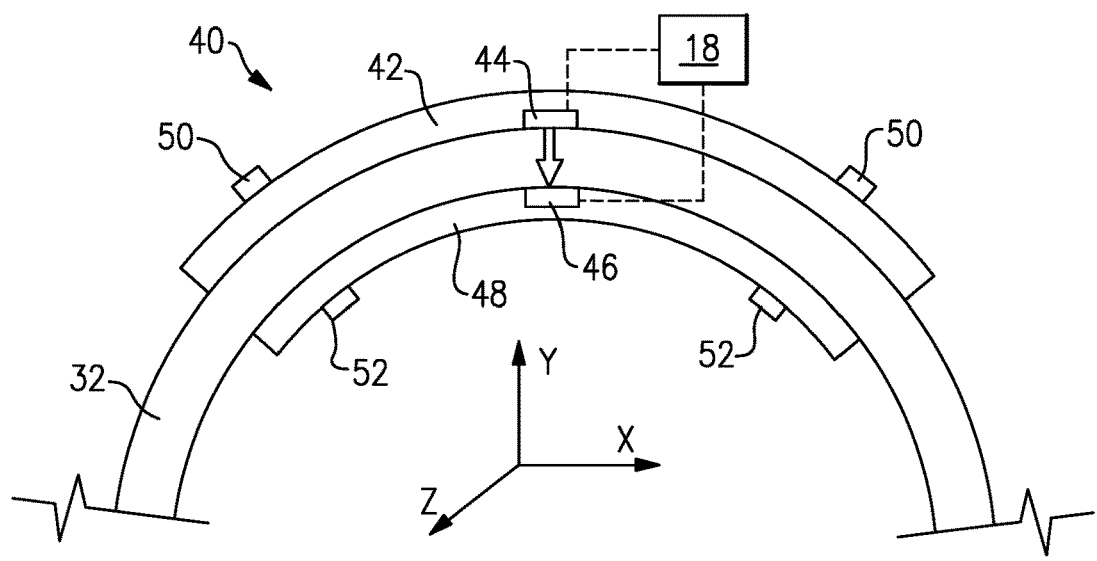
FIG. 3A shows an axial cross-sectional view of first embodiment testing device.

FIG. 3A shows a testing embodiment 40. Transmitter 44 is placed at an outer member 42 on an outer surface of the drive shaft body 32. An inner member 48 includes the receiver 46. While the transmitter 44 is shown outward of the drive shaft body 32 with the receiver 46 inward, the reverse could be utilized.

Magnetic elements 50 are positioned on the member 42, and magnetic elements 52 are positioned on the member 48. In fact, in other embodiments, only one of the members 50/52 need have magnetic properties with the other being an appropriate metallic element, such as with a ferromagnetic metal that would be attracted to a magnet.

Now, when the member 42 is moved, the magnetic attraction will move the member 48 along with the member 42. Thus, even though the drive shaft 32 has a large aspect ratio, there would be little challenge to moving the two members along the inner surface.

Members 42 and 48 are relatively rigid and fixed in shape. However, they are formed to generally correspond to the surface of the drive shaft 32.

Figure 3B:
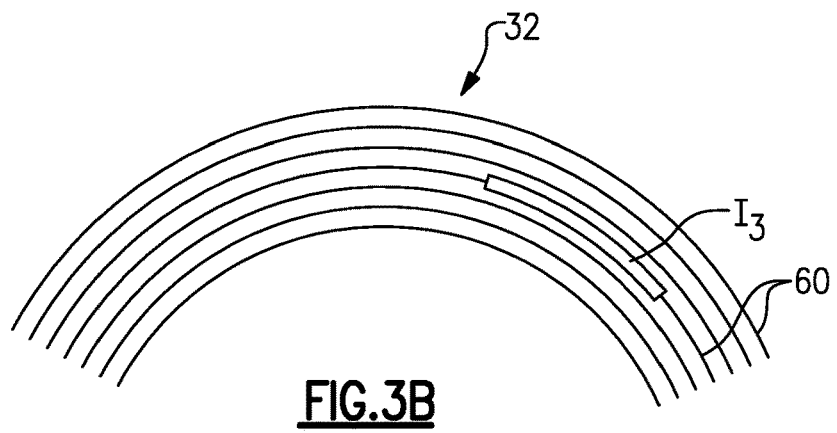
FIG. 3B shows schematically an axial cross-sectional view of a flaw in a drive shaft

During movement the transmitter transmits a signal received by receiver 46. Both communicate with controller 18. As shown in FIG. 3B an example of composite drive shafts with a laminated design, a debonded area 13 is formed between a plurality of layers 60 in the shaft 32.

Figure 3C:
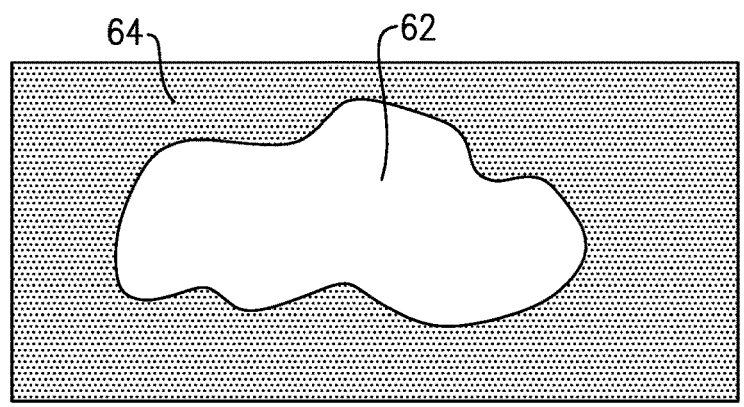
FIG. 3C shows schematically typical results of testing according to the FIG. 3B as a 2D projection of tested surface of the drive shaft.

FIG. 3C schematically shows a two-dimensional (2D) printout 64 that the test apparatus 15 will develop at controller 18 which shows the debonded area as a flaw 62.

Figure 4E:
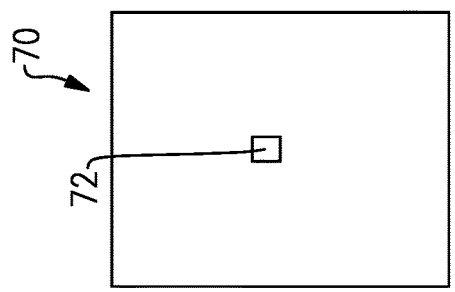
FIG. 4E shows a fifth embodiment of a magnetic element arrangement.
Figure 4D:
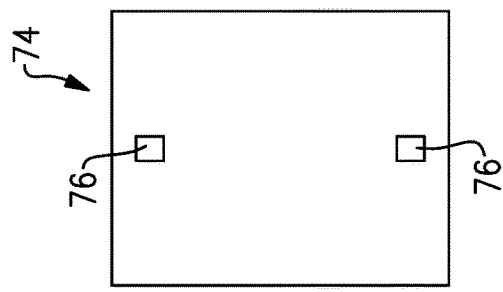
FIG. 4D shows a fourth embodiment of a magnetic element arrangement.
Figure 4C:
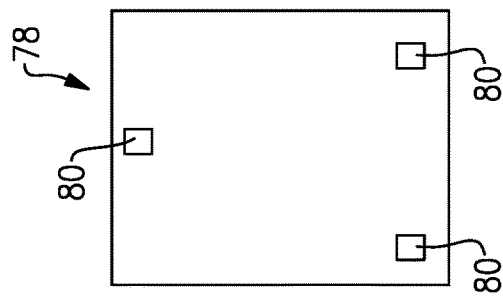
FIG. 4C shows a third embodiment of a magnetic element arrangement.
Figure 4B:
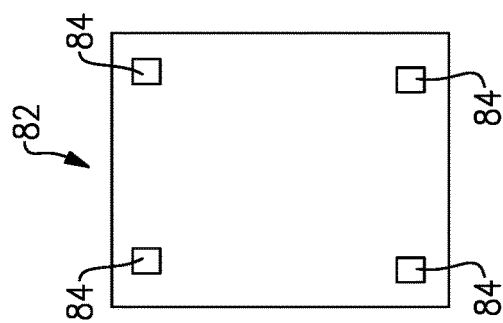
FIG. 4B shows a second embodiment of a magnetic element arrangement.
Figure 4A:
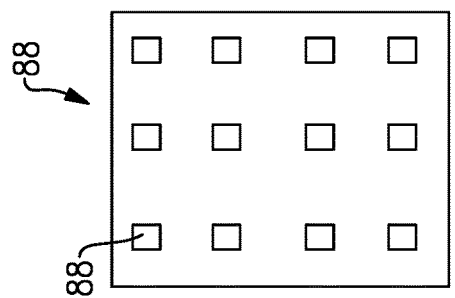
FIG. 4A shows a first embodiment of a magnetic element arrangement.

FIG. 4A shows an embodiment 70 in both the outer and inner members wherein there is a single magnetic/metallic element 72. The elements are shown as 2D views of contact surfaces of the members.

FIG. 4B shows an embodiment 74 in both the outer and inner members wherein there are two magnetic/metallic elements 76. These two elements can be oriented in either axial or circumferential directions. The elements are shown as 2D views of contact surfaces of the members.

FIG. 4C shows an embodiment 78 in both the outer and inner members wherein there are three magnetic/metallic elements 80. These two elements can be oriented in either axial or circumferential directions. The elements are shown as 2D views of contact surfaces of the members.

FIG. 4D shows an embodiment 82 in both the outer and inner members wherein there are four magnetic/metallic elements. The elements are shown as 2D views of contact surfaces of the members.

FIG. 4E shows an embodiment 86 in the outer or inner member wherein there are several rows and columns of magnetic/metallic elements 88. In the illustrated embodiment there are twelve elements, comprising four rows and three columns as an example. The elements are shown as 2D views of contact surfaces of the members.

Figure 5A:
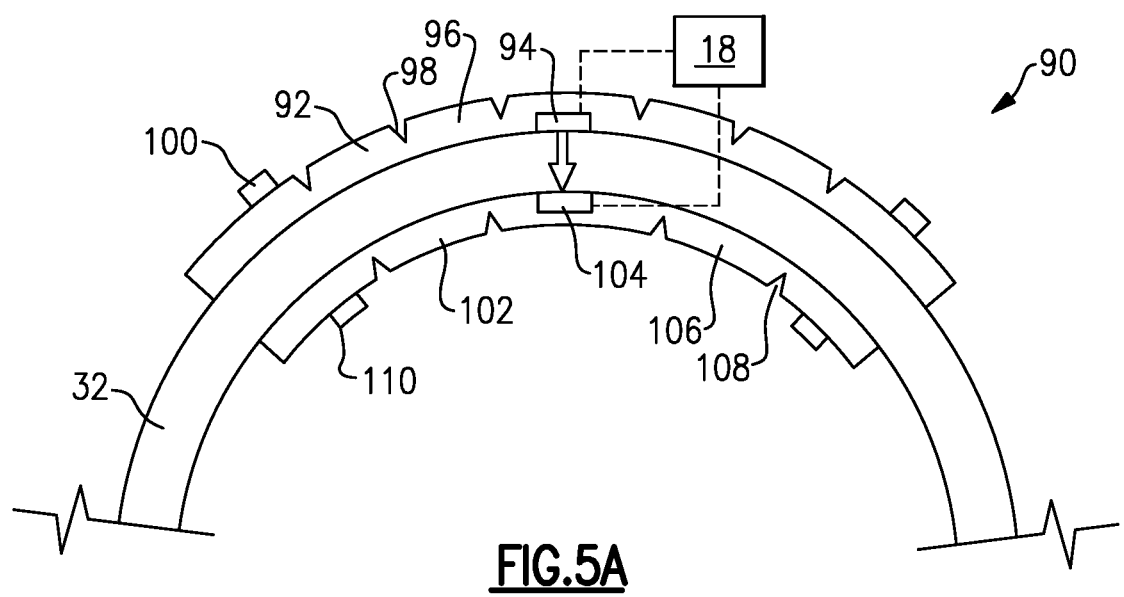
FIG. 5A shows an axial cross-sectional view of another embodiment testing device.

FIG. 5A shows an embodiment 90 wherein the member 92 having the transmitter 94, and member 102 having the receiver 104 are flexible under circumferential bending. The members are flexible due to the presence of grooves 98 and 108 at their periphery. Here again, there are magnetic/metallic elements 100 and 110. The flexible members 92/102 can be adjustable to different radii and shapes of the underlying shaft 32.

Figure 5B:
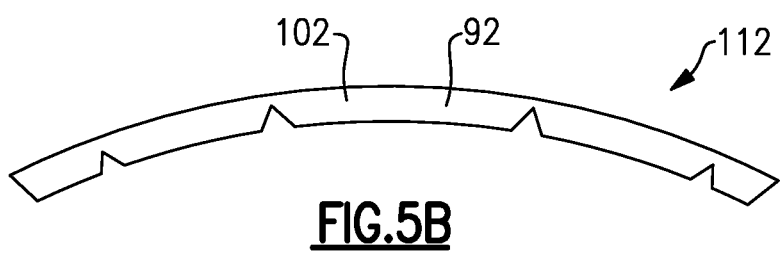
FIG. 5B shows an axial cross-sectional view of of the FIG. 5A testing device before installation.

As shown in FIG. 5B, the member 102 is shown in a first position 112, which may be its relaxed position, i.e., before placing on the drive shaft surface.

Figure 5C:
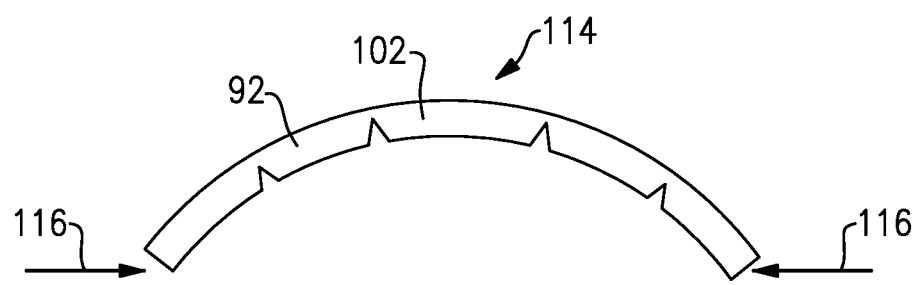
FIG. 5C shows the FIG. 5A portion of the testing device deformed to a different shape during installation.

However, in the FIG. 5C position 114, the member 102 has its ends compressed as shown at 116 to adjust the radius such as to surround to the actual radius of the shaft. While FIGS. 5B and 5C illustrate adjustment of the radius of the inner member 102, the same approach is applied to the outer member 92.

Figure 6A:
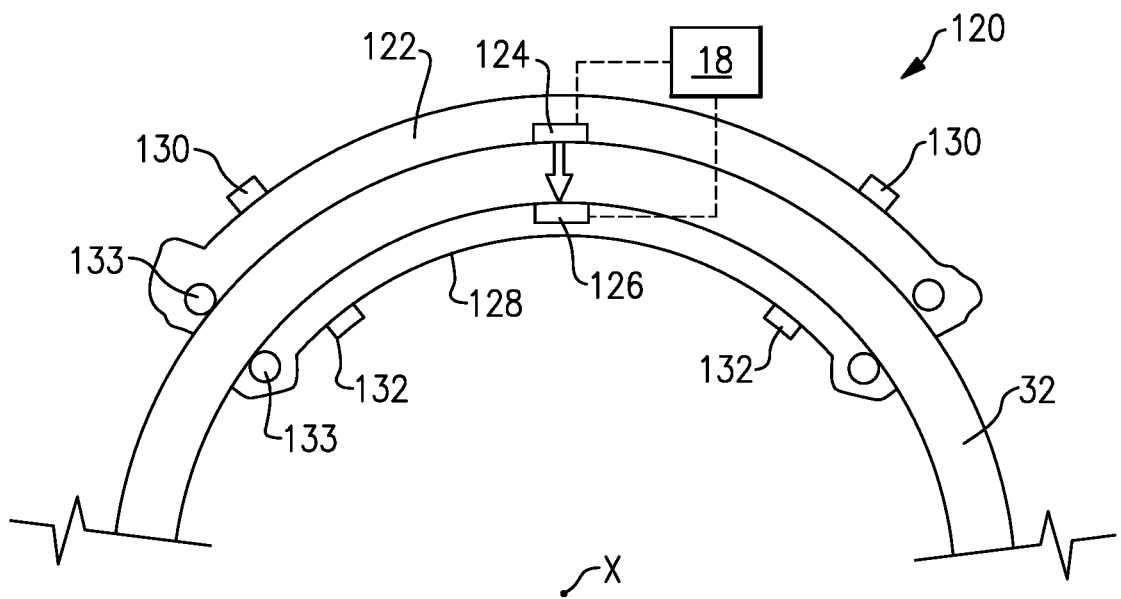
FIG. 6A shows an axial cross-sectional view of yet another embodiment having rollers.

FIG. 6A shows an embodiment 120 having an outer member 122 with a transmitter 124 and an inner member 128 with a transmitter 126. Magnetic/metallic elements 130/132 are shown. Rollers 133 are associated with each of the members 122 and 128, and facilitate movement of the members 122/128 along the shaft 32. In the FIG. 6A embodiment, the roller may rotate about an axis of rotation parallel to a central axis X of the shaft 32, i.e., to facilitate movement in the circumferential direction. Alternatively, the rollers 133 may be spherical and can accommodate movement in both the circumferential and axial directions.

Figure 6B:
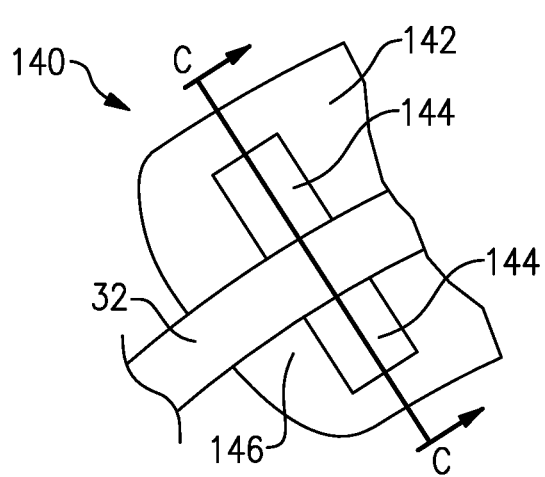
FIG. 6B shows an axial cross-sectional view of a roller embodiment which may be utilized in place of the FIG. 6A embodiment.

FIG. 6B shows an embodiment 140 wherein the inner and outer members 142 and 146 have rollers 144 which roll along an axis which is perpendicular to the central axis X to facilitate movement in an axial direction.

Figure 6C:
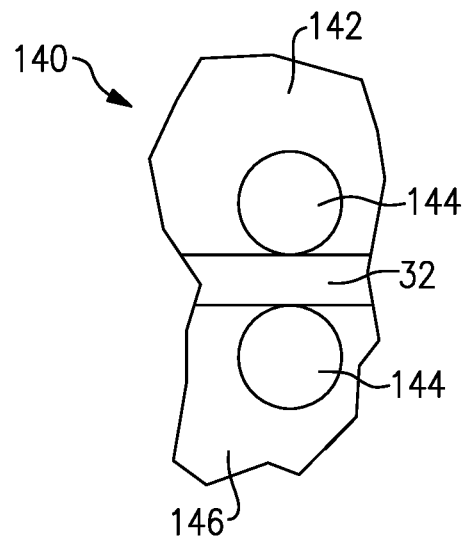
FIG. 6C shows a longitudinal cross-sectional view along line C-C of FIG. 6B.

FIG. 6C shows the axial rollers 144 moving axially along the drive shaft 32.

Figure 7A:
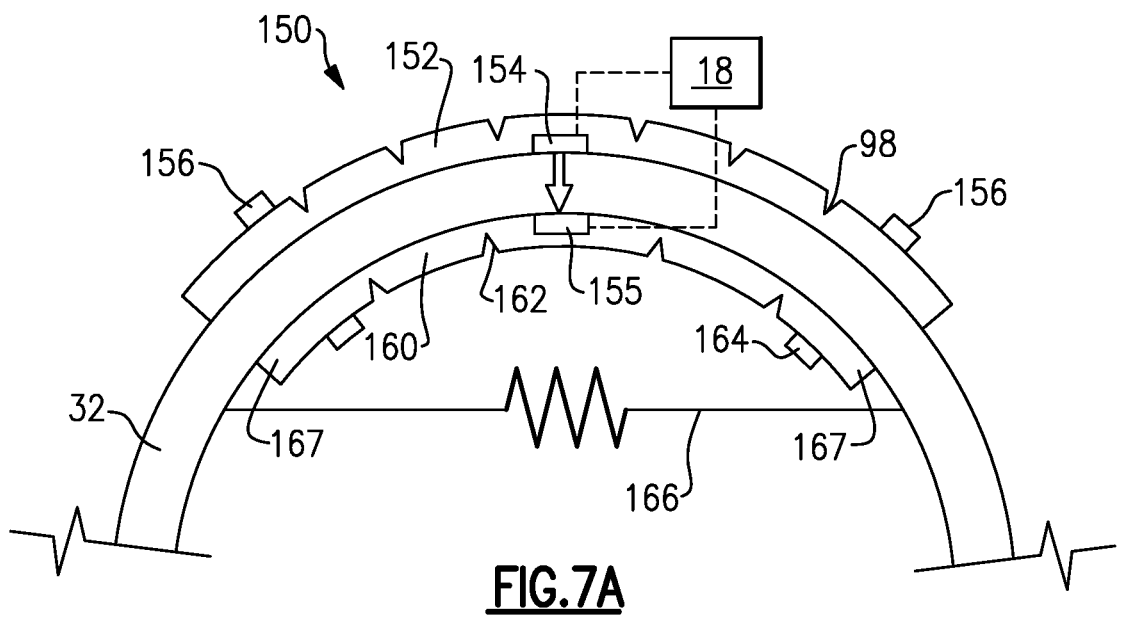
FIG. 7A shows an axial cross-sectional view of yet another embodiment of the testing device.

FIG. 7A shows an embodiment 150 wherein the outer member 152 has the transmitter 154, grooves 98 and magnetic/metallic elements 156. The inner member 160 has the receiver 155, grooves 162, magnetic/metallic elements 164, and a spring member 166 which provides pre-stressed extension on ends 167 holding them in close contact with an inner surface of the shaft 32.

Figure 7B:
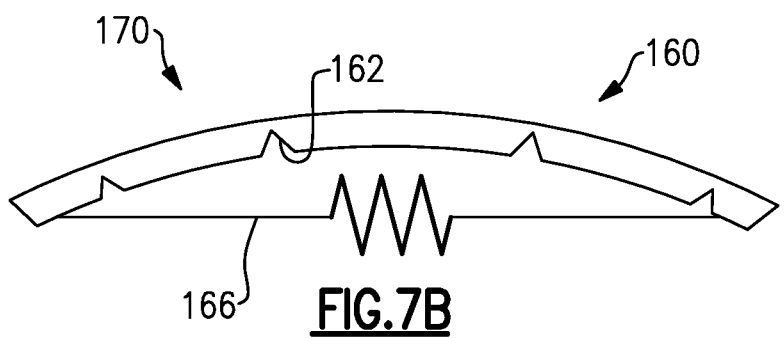
FIG. 7B shows the FIG. 7A embodiment in a first position before installation.

FIG. 7B shows the member 160 in a first relaxed position 170, i.e., before installation.

Figure 7C:
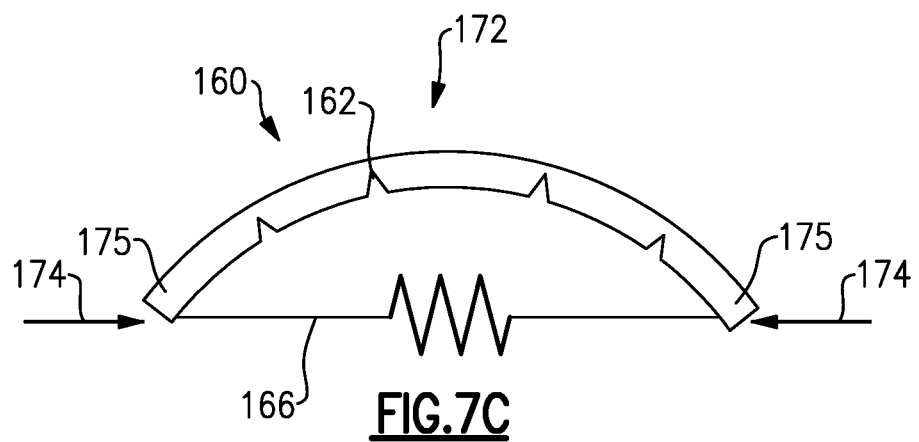
FIG. 7C shows the FIG. 7A testing device deformed to a different position during installation.

FIG. 7C shows a position 172 wherein the spring 166 has compressed ends 175 due to a force 174 to conform, upon installation, to a distinct shape of the inner periphery of the shaft 32.

The illustration of the spring 166 in FIGS. 7A-7C is rather schematic. In different embodiments, different variants of spring 166 can be applied with respect to materials, design, topologies, geometries, etc. Their key requirement is to guarantee sufficient flexibility to satisfy necessary deformation to match differences between the initial (i.e., before installation) and deformed (i.e., at the shaft surface) shapes of the inner or outer members.

FIG. 7D shows another embodiment 290 wherein the inner member 160 has the spring 166 but the outer member 352 also has a spring member with posts 300 providing a reaction surface for the spring 302.

FIG. 7E shows the embodiment 290 in a deformed position due to force 354 before installation.

FIG. 7F shows the FIG. 7D embodiment in a preinstallation position which is generally its relaxed position.

While FIG. 7D shows an embodiment wherein there are spring members associated with both the inner and outer members, it is also possible that an embodiment such as shown in FIGS. 7A-C wherein only the inner member has a spring 166, as well as an embodiment as shown in FIGS. 7D-F where only the outer member has the spring 302 are also within the scope of this disclosure.

Figure 8A:
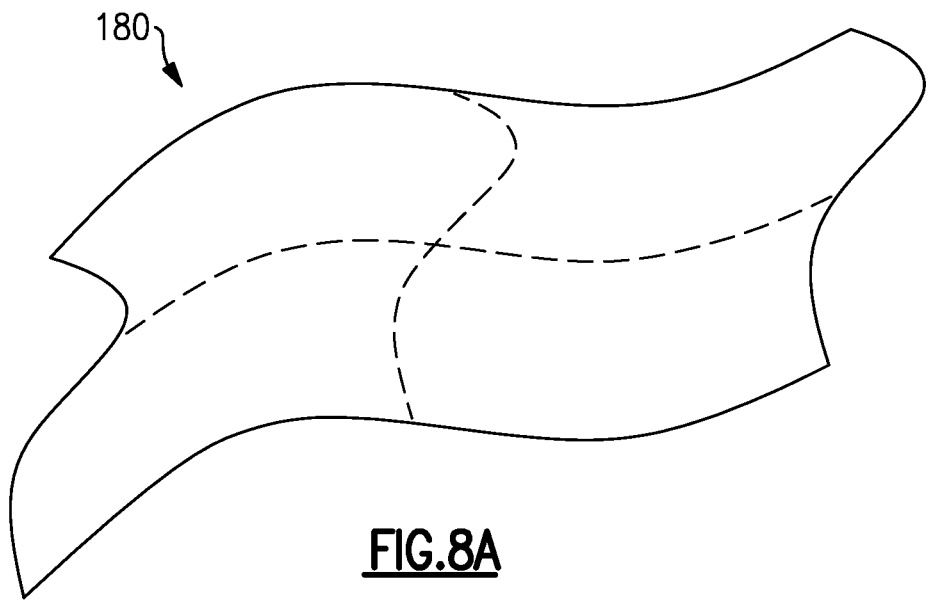
FIG. 8A shows schematically a shell-type body component of the helicopter shown in FIG. 1.

FIG. 8A shows a shell-type body portion 180 which has a complex shape. Such shapes can be expected in different applications requiring ultrasonic testing, for example, as numerous aircraft components.

Figure 8B:
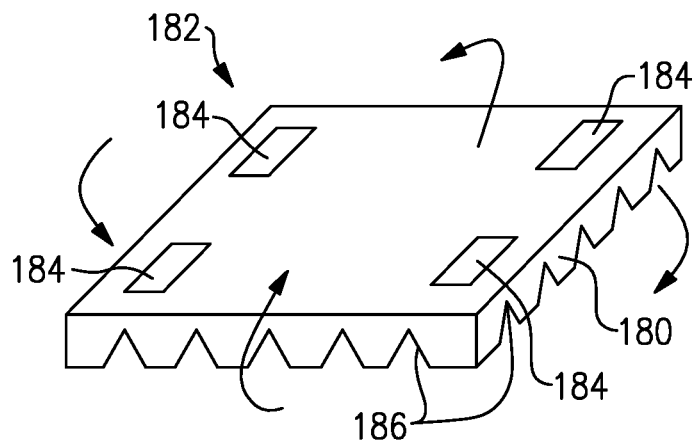
FIG. 8B shows a testing device which may be utilized to test a complex geometry such as the body component shown in FIG. 8A.

It is challenging to test the integrity of a part having a complex shape such body portion 180. Portion 180 may be, for example, a part of the fuselage 19. A testing member 182 as shown in FIG. 8B may have magnetic/metallic elements 184, but also notches 186 along both circumferential and axial directions such that member 182 may bend about multiple axes as shown by the several bending arrows.

Figure 8C:
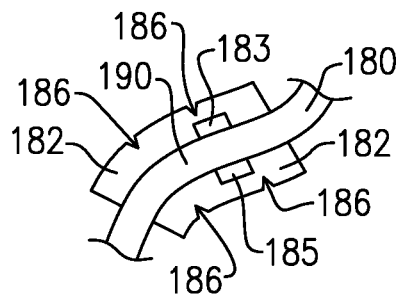
FIG. 8C shows a testing operation on the body portion of FIG. 8A.

Thus, as shown in FIG. 8C, even though the complex body shape has humps such as shown at 190, the members 182 can bend at notches 186 to accommodate that shape. As can be seen, a transmitter 183 and a receiver 185 operate as in the above embodiments.

Figure 9:
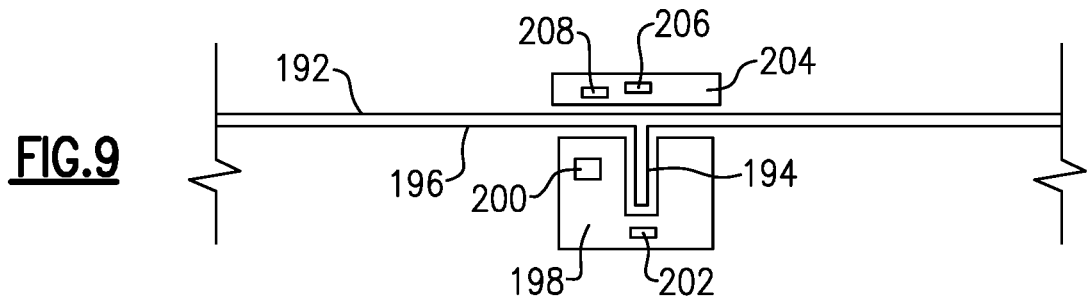
FIG. 9 shows a schematic cross-sectional view of a test device for another body arrangement.

FIG. 9 shows a complex shell-type shape 192 having an inner periphery 196 with an additional part 194 facing inward. In some embodiments, the part 194 can be a stringer to increase local bending stiffness and/or bending strength of the entire component. It should be understood that the part 194 could be on the outer periphery also, facing outward, correspondingly. A first member 204 has a transmitter 206 and a magnetic/metallic element 208. The second member 198 has the receiver 202 and a magnetic/metallic element 200. This allows testing of the part 194 along with the shape of the body part 192.

Figure 10:
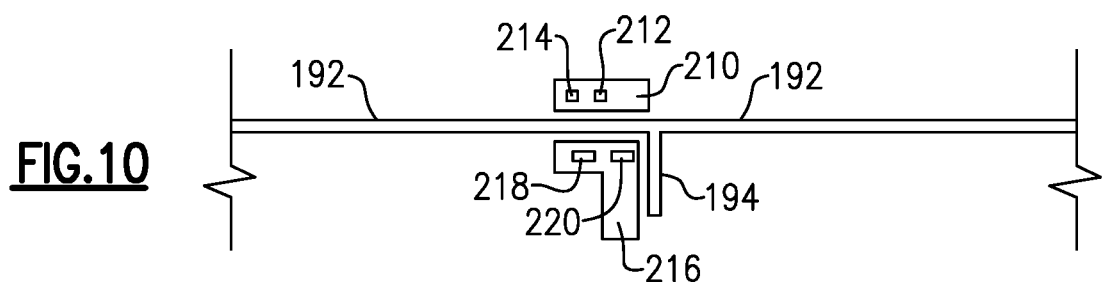
FIG. 10 shows a schematic cross-sectional view of another test device for a particular body shape.

FIG. 10 shows an embodiment wherein one member 210 has a transmitter 212 and a magnet/metal part 214. The other member 216 has a magnetic/metallic element 218 and a receiver 220. These are both positioned on one side of the part 194.

Figure 11:
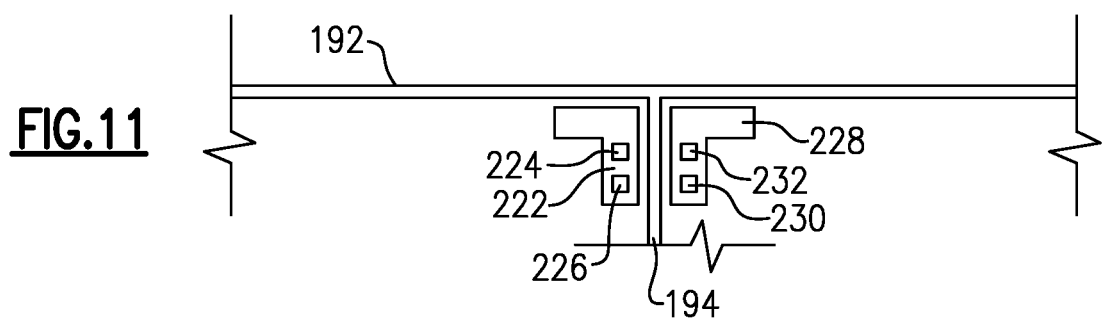
FIG. 11 shows a schematic cross-sectional view of yet another test device for the body shape of FIG. 9.

FIG. 11 shows an embodiment wherein the stringer 194 receives a first testing member 222 on a first side having a transmitter 226 and a magnetic/metallic part 224 and a second member 228 with a receiver 230 and magnetic/metallic element 232. This will allow testing of the integrity of the part 194.

The FIG. 9-11 embodiments would all also be provided with a controller. The controllers according to all of the embodiments are electronic controllers programmed to perform the methods of this disclosure.

Figure 12:
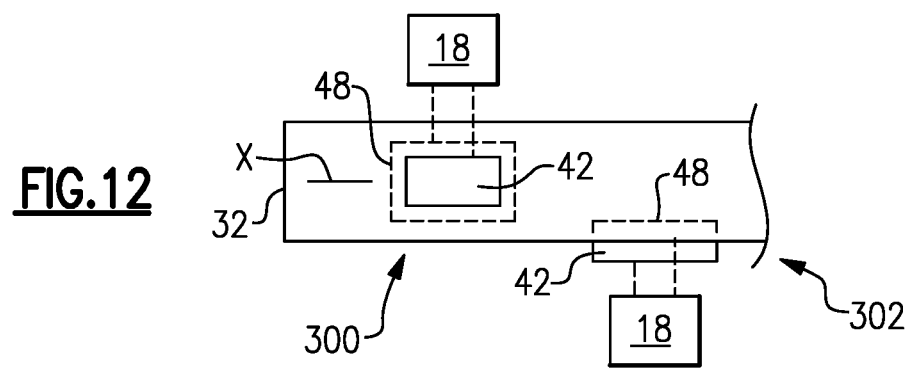
FIG. 12 schematically shows a method of testing according to this disclosure.

A method according to this disclosure is shown in FIG. 12. In FIG. 12 an outer member 42 is positioned on the outer surface of a drive shaft 32. An inner member 48, as described above, is shown by dotted lines where it has been placed within the bore of the drive shaft 32.

The members 42/38 are at a position 300, and one then moves the outer member 42, causing the inner member 48 to move. The two are shown moved to a second position 302.

As can be appreciated from FIG. 12, the second position has resulted in both the members 42 and 48 being moved both axially and circumferentially. The attraction between the magnetic/metallic elements causes the inner member 48 to move with the outer member 42. Since one need not access the inner member, use of the magnetic attraction facilitates the testing of drive shafts having very small aspect ratios, and further facilitates the testing of very complex body shapes. During the movement controller 18 causes an ultrasonic signal to be sent through the drive shaft 32 (or body portion 180) to the receiver and then to controller, which analyzes the information as described above.

When the method is performed with the embodiment of FIGS. 5A-5C, 7A-7C, or FIG. 8B, the placement steps include deforming the members such that they conform to surfaces on the part to be tested. With regard to the FIGS.

5A-5C and FIGS. 7A-7C embodiments this deformation includes bending the members about a rotational axis of a drive shaft. With regard to the embodiment of FIGS. 8B and 8C the deformation would include bending the members about a plurality of axes. With regard to the embodiments of FIGS. 7A-7F, this bending movements includes biasing at least one of the two members with a spring force to conform to the surfaces of the part to be tested.

When the method is performed with the embodiment of FIG. 6A or 6B/6C, the movement is facilitated by rollers which may either roll in a circumferential direction, an axial direction, or both.

Testing devices as disclosed above may be better understood from co-pending U.S. patent application Ser. No. 17/958,866, filed on even date herewith by the applicant of this application and entitled "Device for Testing Drive Shafts and Other Bodies." The disclosure of that application is incorporated herein by reference.

A method of testing a part under this disclosure could be said to include the steps of placing a first member on a surface of a part to be tested. A second member is placed on an opposed surface of the part to be tested. One of the first and second members have an ultrasonic transmitter and the other has an ultrasonic receiver. At least one of the first and second members have at least one magnetic element and the other of the first and second members have at least one of a magnetic element or a ferromagnetic metallic element which is attracted to magnets, and moves one of the first and second members along the surface of the part such that magnetic attraction causes the other of the first and second members to move along the opposed surface of the part with the one of the members. A controller causes an ultrasonic signal to be sent from the transmitter through the part to be tested which is received by the receiver and then analyzed by an ultrasonic testing machine.

While embodiments have been disclosed, a worker of skill in this art would recognize that certain modifications would come within the scope of this disclosure. For that reason, the following claims should be studied to determine the true scope and content of this disclosure.

What is claimed is:

1. A method of testing a part comprising the steps of:
   placing a first member on a surface of a part to be tested, and placing a second member on an opposed surface of the part to be tested, with one of said first and second members having an ultrasonic transmitter and the other having an ultrasonic receiver, with at least one of said first and second members having at least one magnetic element and the other of said first and second members having at least one of a magnetic element or a ferromagnetic metallic element which is attracted to magnets, and moving one of said first and second members along the surface of the part such that magnetic attraction causes the other of said first and second members to move along the opposed surface of the part with the one of said members;
   causing an ultrasonic signal to be sent through the part to be tested, which is received and then analyzed by an ultrasonic testing machine;
   wherein said first member and said second member can deform to facilitate bending flexibility to conform to the surface of the part to be tested; and
   wherein the first member and second member have grooves in two different directions such that the deformation can occur in a plurality of dimensions to conform to the shape of surface of the part to be tested.

2. The method as set forth in claim 1, wherein the part to be tested is a shaft, and the movement is in both an axial and circumferential direction about a central axis of the shaft.

3. The method as set forth in claim 2, wherein rollers are associated with each of said first and second members and facilitate the movement of said first and second members.

4. The method as set forth in claim 3, wherein said rollers facilitate the movement of said first and second members in the axial direction.

5. The method as set forth in claim 1, wherein the part to be tested is a drive shaft having a central axis, and the bending deformation of the members is in a plane which is perpendicular to said central axis.

6. The method as set forth in claim 5, wherein at least one of said first and second members having a spring member to cause the one of said first and second members to conform to the surface of the drive shaft.

7. The method as set forth in claim 6, wherein both the first and second members have the spring member.

8. The method as set forth in claim 5, wherein the drive shaft has an aspect ratio of length to outer diameter greater than 5.

9. The method as set forth in claim 1, wherein the part to be tested has a plurality of fiber-reinforced polymer-matrix lamina, and debond between the adjacent lamina can be detected during the testing.

10. The method as set forth in claim 1, wherein said first member and said second member each have the at least one magnetic element.

11. The method as set forth in claim 1, wherein at least one of said first member and said second member have the at least one magnetic element and the other of said first member and said second member have a ferromagnetic metallic element.

12. The method as set forth in claim 1, wherein there are a plurality of said at least one magnetic element or said at least one ferromagnetic metallic element associated with each of said first member and said second member.

13. The method as set forth in claim 1, wherein the part to be tested is a body portion having a complex shell-type shape.

14. The method as set forth in claim 13, wherein the part to be tested includes a stringer extending off the surface of the said body portion, and said first member and said second members having a shape to correspond at least partially to external surfaces of the stringer.

15. The method as set forth in claim 14, wherein said first and second members are positioned on opposed surfaces of the stringer.

16. A method of testing a part comprising the steps of:
   placing a first member on a surface of a part to be tested, and placing a second member on an opposed surface of the part to be tested, with one of said first and second members having an ultrasonic transmitter and the other having an ultrasonic receiver, with at least one of said first and second members having at least one magnetic element and the other of said first and second members having at least one of a magnetic element or a ferromagnetic metallic element which is attracted to magnets, and moving one of said first and second members along the surface of the part such that magnetic attraction causes the other of said first and second members to move along the opposed surface of the part with the one of said members;
   causing an ultrasonic signal to be sent through the part to be tested, which is received and then analyzed by an ultrasonic testing machine;

wherein the part to be tested is a shaft, and the movement is in both an axial and circumferential direction about a central axis of the shaft;

wherein rollers are associated with each of said first and second members and facilitate the movement of said first and second members;

wherein said rollers facilitate the movement of said first and second members in the axial direction;

wherein said rollers also facilitate the movement in the circumferential direction;

wherein said first member and said second member can deform to facilitate bending flexibility to conform to the surface of the part to be tested; and wherein the first member and second member have surface grooves extending in two different directions such that the deformation can occur in a plurality of dimensions to conform to the shape of surface of the part to be tested.

17. The method as set forth in claim 3, wherein the rollers facilitate movement in the circumferential direction.

18. A method of testing a part comprising the steps of:

placing a first member on a surface of a part to be tested, and placing a second member on an opposed surface of the part to be tested, with one of said first and second members having an ultrasonic transmitter and the other having an ultrasonic receiver, with at least one of said first and second members having at least one magnetic element and the other of said first and second members having at least one of a magnetic element or a ferromagnetic metallic element which is attracted to magnets, and moving one of said first and second members along the surface of the part such that magnetic attraction causes the other of said first and second members to move along the opposed surface of the part with the one of said members;

causing an ultrasonic signal to be sent through the part to be tested, which is received and then analyzed by an ultrasonic testing machine;

wherein the part to be tested is a body portion having a complex shell-type shape;

wherein the first member and second member have grooves extending in two different directions such that their bending deformation can occur in a plurality of dimensions to conform to the shape of the surface of the part to be tested.

* * * * *